(12) United States Patent
Oschmann

(10) Patent No.: US 8,067,130 B2
(45) Date of Patent: Nov. 29, 2011

(54) CATALYST-COATED MEMBRANE WITH INTEGRATED SEALING MATERIAL AND MEMBRANE-ELECTRODE ASSEMBLY PRODUCED THEREFROM

(75) Inventor: Heiko Oschmann, Friedberg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 1202 days.

(21) Appl. No.: 10/572,652

(22) PCT Filed: Sep. 18, 2004

(86) PCT No.: PCT/EP2004/010501
§ 371 (c)(1),
(2), (4) Date: Apr. 19, 2007

(87) PCT Pub. No.: WO2005/029620
PCT Pub. Date: Mar. 31, 2005

(65) Prior Publication Data
US 2007/0298302 A1     Dec. 27, 2007

(30) Foreign Application Priority Data
Sep. 20, 2003   (EP) .................... 03021349

(51) Int. Cl.
*H01M 8/02* (2006.01)
*H01M 8/10* (2006.01)
(52) U.S. Cl. .................. 429/508; 429/479; 429/509
(58) Field of Classification Search .................. None
See application file for complete search history.

(56) References Cited

U.S. PATENT DOCUMENTS

| | | | |
|---|---|---|---|
| 6,475,656 B1 * | 11/2002 | Koschany et al. | ............ 429/483 |
| 6,756,147 B1 | 6/2004 | Bronold et al. | |
| 6,852,440 B1 | 2/2005 | Bonsel et al. | |
| 2002/0015873 A1 | 2/2002 | Bruckner et al. | |

FOREIGN PATENT DOCUMENTS

| | | |
|---|---|---|
| DE | 199 03 352 A | 10/2000 |
| DE | 199 26 027 A | 11/2000 |
| WO | WO 00/10215 | 2/2000 |

OTHER PUBLICATIONS

International Search Report Dated, Mar. 2, 2005.
Written Opinion of the International Searching Authority dated Mar. 2, 2005.

* cited by examiner

*Primary Examiner* — Barbara Gilliam
*Assistant Examiner* — Angela Martin
(74) *Attorney, Agent, or Firm* — Levin Santalone LLP; John Santalone

(57) ABSTRACT

The invention relates to a catalyst-coated ion-conducting membrane and a membrane-electrode assembly (MEA) for electrochemical devices, in particular for fuel cells. The catalyst-coated, ion-conducting membrane is provided with a sealing material which is applied in the edge region to one side of the membrane and has a thickness which corresponds to at least the total thickness of the catalyst-coated membrane. Owing to their simple, material-conserving construction, the catalyst-coated ion-conducting membranes and the membrane-electrode assemblies produced therefrom can be manufactured inexpensively. They are used in PEM fuel cells, direct methanol fuel cells (DMFCs), electrolyzers and other electrochemical devices.

6 Claims, 2 Drawing Sheets

Figure 1:

CATALYST-COATED MEMBRANE WITH INTEGRATED SEALING MATERIAL AND MEMBRANE-ELECTRODE ASSEMBLY PRODUCED THEREFROM

The invention relates to the field of electrochemistry and describes a catalyst-coated membrane and a membrane-electrode assembly produced therefrom for electro-chemical devices, for example fuel cells, electrolyzers or electrochemical sensors. Furthermore, a process for producing the catalyst-coated membrane and membrane-electrode assemblies is disclosed and their use is described.

Fuel cells convert a fuel and an oxidant at separate locations at two electrodes into electric power, heat and water. The fuel employed can be hydrogen or a hydrogen-rich gas, and the oxidant used can be oxygen or air. The energy conversion process in the fuel cell has a particularly high efficiency. For this reason, the fuel cells are becoming increasingly important for mobile, stationary and portable applications.

Owing to their compact construction, their power density and their high efficiency, membrane fuel cells (PEMFC, DMFC, etc.) are particularly suitable for use in a wide variety of fields.

For the purposes of the present invention, a fuel cell stack is a stack of fuel cell units. A fuel cell unit will hereinafter also be referred to as a fuel cell for short. It comprises a membrane-electrode assembly ("MEA") which is located between bipolar plates, which are also referred to as separator plates and serve to bring gas to the unit and conduct away electric current.

A membrane-electrode assembly comprises an ion-conducting membrane which is provided on both sides with catalyst-coated reaction layers, viz. the electrodes. One of the reaction layers is configured as anode for the oxidation of hydrogen and the second reaction layer is configured as cathode for the reduction of oxygen. Gas diffusion layers (abbreviated as "GDLs") made of carbon fiber felt, carbon fiber paper or woven carbon fiber fabrics are applied to these catalyst layers. The GDLs provide good access for the reaction gases to the electrodes and readily conduct away the cell current. For the purposes of the present invention, such an arrangement will be referred to as a five-layer membrane-electrode assembly ("5-layer MEA"). In contrast to this, there is the ion-conducting membrane coated with catalyst on the front and reverse sides which is referred to as 3-layer CCM ("catalyst-coated membrane"). It contains no gas diffusion layers. If only one side of the ion-conducting membrane is coated with catalyst, this is referred to as a two-layer catalyst-coated membrane ("2-layer CCM").

Anode and cathode generally contain electrocatalysts which catalyze the respective reaction (oxidation of hydrogen or reduction of oxygen). As catalytically active components, preference is given to using the metals of the platinum group of the Periodic Table of the Elements. The majority of catalysts used are supported catalysts in which the catalytically active platinum group metals have been applied in finely divided form to the surface of a conductive support material. The mean crystallite size of the platinum group metals is from about 1 to 10 nm. Finely divided, conductive carbon blacks have been found to be useful as support materials.

The ion-conducting membrane preferably comprises proton-conducting polymer materials. These materials will hereinafter also be referred to as ionomers for short. Preference is given to using a tetrafluoro-ethylen-fluorovinyl ether copolymer bearing sulfonic acid groups. This material is, for example, marketed under the trade name Nafion® by DuPont. However, it is also possible to use other, in particular fluorine-free ionomer materials such as doped sulfonated polyether ketones or doped sulfonated or sulfinated aryl ketones and also doped polybenzimidazoles. Suitable ion-conducting membranes are described by O. Savadogo in "Journal of New Materials for Electrochemical Systems" I, 47-66 (1998). For use in fuel cells, these membranes generally need to have a thickness of from 10 to 200 microns.

The present invention describes catalyst-coated membranes (CCMs) and membrane-electrode assemblies (MEAs) having an integrated sealing material. The products according to the invention have a simplified, material-conserving structure and can therefore be produced more cheaply than the conventional materials obtainable according to the prior art.

The sealing of the gas spaces of a fuel cell from the ambient air and the other reactive gas in this case is essential to the safety and to the wide introduction of fuel cell technology. The use of sealing materials and their integration into the construction concept of the MEA is therefore of great importance.

Such construction concepts for membrane-electrode assemblies are described, for example, in U.S. Pat. No. 3,134,697 and in EP 700,108 A2. In these concepts, the membrane forms a rim extending over the electrodes and when the cell is sealed this is clamped between the cell plates and, if necessary, between further seals. However, membrane-electrode assemblies (MEAS) having such an overhanging membrane rim are susceptible to mechanical damage to the membrane during manufacture and assembly. Damage to the membrane easily leads to failure of the cell, since the membrane has to separate the gas spaces of the reactive gases hydrogen and oxygen from one another. Furthermore, the production of such products uses an increased amount of ion-conducting membrane material due to the area of the overhanging rim. Depending on the structure and construction of the MEA, up to 50% more membrane material (based on the active area of the membrane) is required. Thus, for example, an MEA having an active area of 50 $cm^2$ (i.e. with dimensions of 7.1×7.1 cm) and a circumferential overhanging rim of 0.9 cm has a total area of 64 $cm^2$. This corresponds to an additional area of 28% (based on the active area of 50 $cm^2$) of membrane material being required. Ionomer membranes are organic polymers having a complicated structure and are therefore expensive. Larger membrane rims increase the material losses and thus finally make the total MEA product more expensive.

EP 586,461 B1 discloses a membrane-electrode assembly containing integrated sealing materials. This MEA has a five-layer structure and is composed of an anode consisting of a catalyst-coated gas diffusion layer (GDL), an ion-conducting membrane and a cathode which once again consists of a catalyst-coated gas diffusion layer. In contrast to the present patent application, no catalyst-coated membranes ("CCMs") are used for producing this MEA. The MEA production process is significantly more inflexible and differs substantially from the present patent application. In the preferred embodiment of EP 586,461 B1, two layers of sealing material are required and in a further embodiment one layer of sealing material is employed, but considerable amounts of this are used since the sealing material is applied to the outside of the uppermost electrode (i.e. on the uppermost catalyst-coated gas diffusion layer) in order to produce the composite of the total MEA. Since anode, membrane and cathode each have to have a contact area for the sealing material, there is a large overlap zone which leads to a considerable loss of active MEA area.

EP 1,037,295 B1 describes the continuous production of catalyst-coated membranes by means of screen printing. The catalyst layers are printed selectively (i.e. in a particular pattern) on the membrane in the form of a tape. A margin which consists of membrane area but does not serve as active area is produced. The CCMs produced by this process are therefore expensive and incur relatively high materials costs.

It is therefore an object of the present invention to provide a catalyst-coated ion-conducting membrane which contains an integrated sealing material and can be produced inexpensively and simply. To allow inexpensive production, the ion-conducting membrane should be coated with catalyst over the entire front and/or reverse side and have no additional membrane rim. The catalyst-coated ion-conducting membrane should be able to be processed further in a simple process to produce a five-layer membrane-electrode assembly.

This object is achieved by provision of a catalyst-coated membrane as claimed in claim 1. Preferred embodiments are described in the subsequent claims. Further claims describe the production of membrane-electrode assemblies in which these catalyst-coated membranes are present.

A feature of the catalyst-coated membranes (CCMs) of the invention is that they comprise a sealing material which is applied on one side in the edge region of the ion-conducting membrane. The thickness of the sealing material is at least as great as the thickness of the coated ion-conducting membrane. The ion-conducting membrane is coated with catalyst over the entire front and/or reverse side and has no circumferential, uncoated margin. The figures below describe various embodiments of the invention in more detail.

FIG. 1A shows a preferred embodiment of the catalyst-coated membrane which in this case consists of two layers ("2-layer CCM"). Here, the ion-conducting membrane (1) is provided with a catalyst layer (3) over the entire area of the membrane (i.e. without a margin). A sheet-like sealing material (4) is applied to the opposite, uncoated side of the membrane.

Figure 1B:
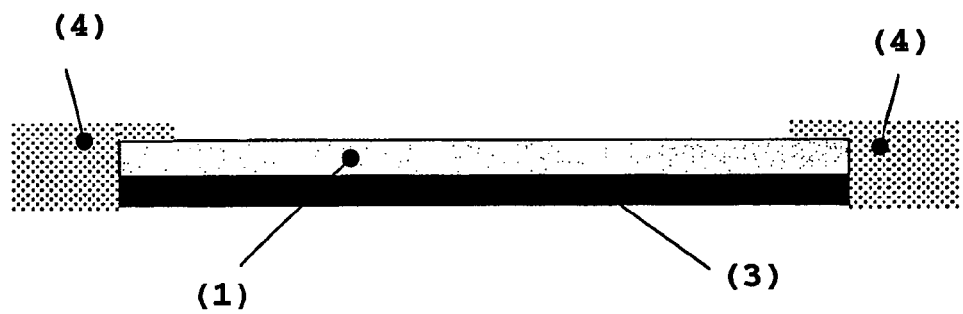

FIG. 1B shows the two-layer structure with sealing material (4) in the joined state.

Figure 1C:
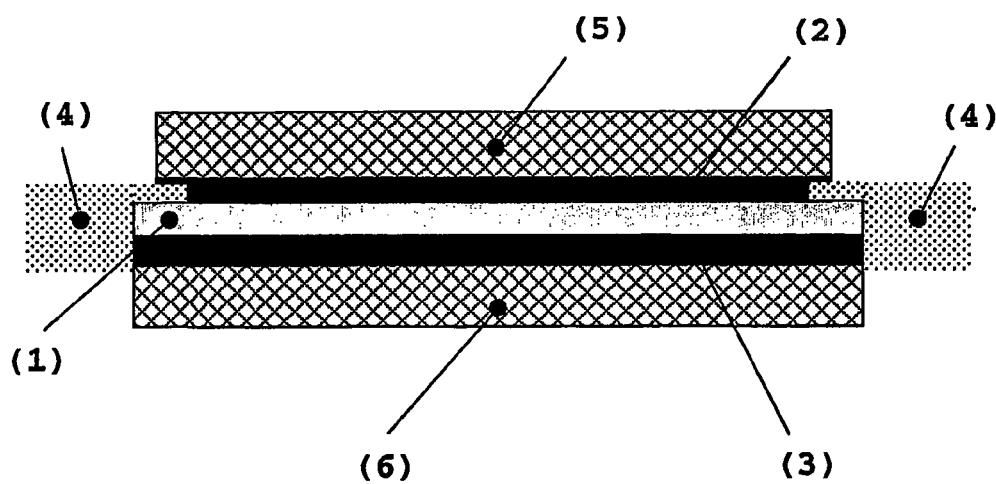

FIG. 1C shows a five-layer membrane-electrode assembly of the "semi-coextensive" design produced therefrom, which is obtainable by combining a catalyst-coated gas diffusion layer (5) on the front side and a catalyst-free gas diffusion layer (6) on the reverse side with a two-layer catalyst-coated membrane. The ion-conducting membrane (1) and gas diffusion layer (5) have different dimensions. The sealing material (4) is integrated into the membrane-electrode assembly and joins the insides (i.e. the sides facing the membrane) of the gas diffusion layers (5) and (6).

Figure 2A:

FIG. 2A shows a further preferred embodiment of the present invention. The catalyst-coated membrane used here consists of three layers ("3-layer CCM"). The ion-conducting membrane (1) is provided on the front side with catalyst layer (2) and on the reverse side with catalyst layer (3). Both catalyst layers are applied over the entire area of the membrane, i.e. there is no uncoated membrane margin. A sheet-like sealing material (4) is applied to one side of the CCM.

Figure 2B:
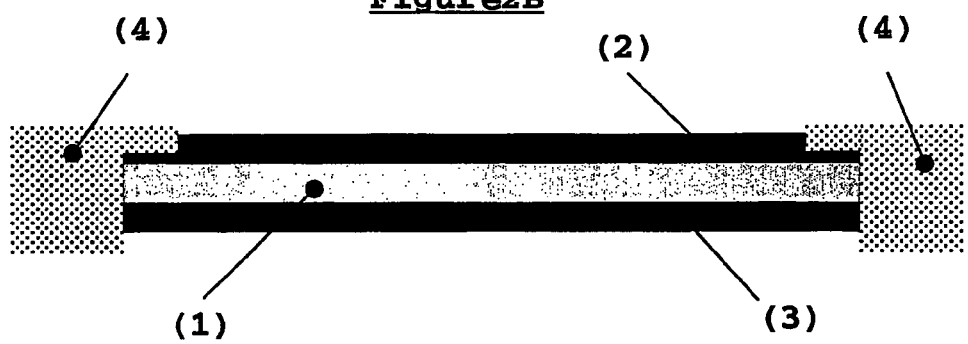

FIG. 2B shows the three-layer structure with sealing material (4) in the joined state.

Figure 2C:
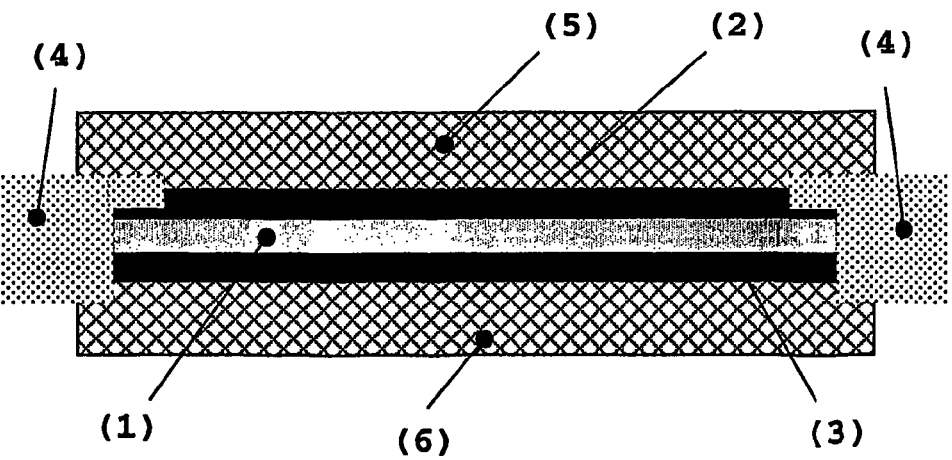

FIG. 2C shows a five-layer membrane-electrode assembly produced therefrom which is obtained by combining a catalyst-free gas diffusion layer (5) on the front side and a catalyst-free gas diffusion layer (6) on the reverse side with the three-layer catalyst-coated membrane ("3-layer CCM"). Here too, the sealing material (4) is integrated into the membrane-electrode assembly and joins the insides (i.e. the sides facing the membrane) of the gas diffusion layers (5) and (6).

The catalyst-coated ion-conducting membranes can be produced by an inexpensive process since full-area coating of the membrane surface can be carried out. CCMs having different formats and patterns can be obtained by simple cutting or stamping from a membrane coated over its entire area.

Coating the membrane by means of screen printing does not require expensively produced screens, dimensional problems do not occur. A considerable saving of expensive membrane material is achieved, since a membrane margin does not arise. Furthermore, the sealing material is also used in cost-saving fashion and only used to provide contact on the insides of the gas diffusion layers. The catalyst-coated ion-conducting membranes can be processed further in a simple process (e.g. by superposition in fuel cell stack, by adhesive bonding, pressing or by lamination) to produce five-layer membrane-electrode assemblies. If desired, the entire process can be carried out in the continuous mode.

It has been found that it is advantageous for the sealing material to be formed as a sheet and be applied to the membrane in an edge region of a particular minimum width. It is advantageous for the sealing material to overlap the ion-conducting membrane at the edge to a width of at least 1 mm.

It is also advantageous for the thickness of the sealing material ($d_D$) to be at least as great as the total thickness of the coated ion-conducting membrane ($d_{CCM}$). This achieves gas-tight, strong and durable bonding of the components. If, for example, a membrane made of Nafion 112® (DuPont) having a thickness of 50 microns is used and catalyst layers having a total thickness of, for example, 15 microns are applied, the total layer thickness of the coated ion-conducting membrane ($d_{CCM}$) is 65 microns. The thickness of the sealing material ($d_D$) should therefore likewise be at least 65 microns. Lower thicknesses of the sealing material lead to damage to the catalyst layers, too high layer thicknesses (i.e. thicknesses which are 50% greater than the total thickness of the CCM) lead to unnecessary consumption of material and also to dimensional problems.

As sealing material, it is possible to use polymers which under the operating conditions of the fuel cell do not release substances which would be able to interfere in the electrocatalysis or adversely affect the function of the fuel cell in another way. The polymers have to be able to provide a gas-tight contact between the gas diffusion structures and active catalyst layers. A further important feature of these polymers is the ability to form a strong, integral bond with the polymer electrolyte membrane. Possible sealing materials are thermoplastic polymers and/or copolymers of the classes polyethylene, polypropylene, polyamides, polyurethanes, polyesters, elastomers such as silicone rubber, EPDM and thermosets such as epoxy resins and cyano-acrylates.

To apply the sealing material, the polymer can be used in the form of a precut film or as a liquid or molding composition. When a precut film is used for the production process, the ion-conducting membrane can be placed together with an appropriately precut frame of sealing material in a press. The frame is cut so that its inner open area corresponds to the dimensions of the desired active area of the MEA. The sealing material is then applied with heating and under pressure. To carry out this process, it is possible to use heatable hydraulic presses, calenders, rollers, roller presses or other lamination devices, all of which can, if appropriate, be operated continuously. The pressing pressure is referred to as area pressure in the present patent application. The area pressures employed (which are based on the window area of the sealing material) are in the range from 50 to 300 N/cm². The temperatures are in the range from 20 to 200° C. The pressing time is preferably in the range from 1 to 10 minutes.

The subsequent further processing of the catalyst-coated membranes to produce membrane-electrode assemblies can be carried out using the same devices. For this purpose, the area pressures (based on the total area of the larger gas diffusion layer) employed are preferably in the range from 50 to 200 N/cm².

However, it is also possible to combine the catalyst-coated membrane, the sealing material and the gas diffusion layers required in a multilayer structure and to produce the five-layer membrane-electrode assembly in one step (i.e. single-stage production). The values for the area pressure are then selected from within the above-described ranges.

The five-layer membrane-electrode assemblies can be either of the "coextensive" design or of the "semi-coextensive" design. "Coextensive" means that the GDLs cover the entire area of the ion-conducting membrane, while "semi-coextensive" means that the ion-conducting membrane and the GDLs have different dimensions.

The gas diffusion layers (GDLs) can consist of porous, electrically conducted materials such as woven carbon fiber fabrics, carbon fiber felts or carbon fiber papers. They can, if required, be waterproofed and/or have an additional microlayer applied to the side which is in contact with the ion-conducting membrane. Furthermore, it can be provided with a catalyst layer. Such gas diffusion layers are now commercially available.

The catalyst-coated ion-conducting membranes (CCMs) and the membrane-electrode assemblies produced therefrom are used in PEM fuel cells, direct methanol fuel cells (DMFCs), electrolyzers and other electrochemical devices.

The following examples illustrate the invention.

EXAMPLE 1 a) Production of a Three-layer CCM with Integrated Sealing Material

A three-layer membrane coated with catalyst over its entire area (CCM type for hydrogen/air operation; Umicore AG & Co KG, Hanau) is used as starting material. The Pt loading of the CCM is 0.2 mg of Pt/cm$^2$ on the anode side and 0.4 mg Pt/cm$^2$ on the cathode side (i.e. total loading=0.6 mg Pt/cm$^2$). The dimensions are 72×72 mm, the thickness of the membrane is 25 micron and the total thickness of the catalyst layers is 22 micron. A sealing rim of polyamide (Vestamelt 3261, Degussa, Düsseldorf) having a thickness of 50 micron, internal window size of 68×68 mm and external dimensions of 100×100 mm is centered on the CCM and pressed between two PTFE plates of a hot press. The hot press is set so that it applies an area pressure of 250 N/cm$^2$ based on the area of the sealing rim. The temperature is 160° C. and the pressing time is 2 minutes. After slow cooling, the structure is taken from the press.

b) Production of a Five-layer MEA (Semi-coextensive Design)

The three-layer CCM with sealing rim applied on one side is positioned centrally between two catalyst-free gas diffusion layers (type 30 BC, SGL-Carbon, Meitingen) having dimensions of 72×72 mm (anode) and 76×76 mm (cathode). The structure is subsequently pressed in a hot press at 135° C. for 3 minutes, with the hot press being set so that it applies an area pressure of 100 N/cm$^2$ based on the area of the larger gas diffusion layer. Slow cooling gives a five-layer MEA whose individual components are firmly bonded.

c) Electrochemical Measurement

The five-layer MEA is built into a single cell in a PEM fuel cell test station and tested under hydrogen/air conditions (pressure: 1 bar, temperature: 70° C.). A cell voltage of 715 mV is obtained at a current density of 600 mA/cm$^2$. This corresponds to a good power density of 0.43 W/cm$^2$.

EXAMPLE 2 a) Production of a Two-layer CCM with Integrated Sealing Material

A 50 micron thick ionomer membrane is coated with a catalyst layer by continuous screen printing. A cathode layer having a Pt loading of 0.4 mg Pt/cm$^2$ and a thickness of 15 micron is applied. After drying, an active area of 72×72 mm is stamped from this structure. A polyamide sealing rim (cf. example 1; window size 68×68 mm; thickness: 75 micron; external dimensions 100×100 mm) is centered on the uncoated membrane side and the overall structure is pressed between two PTFE plates in a hot press. The area pressure is 250 N/cm$^2$ based on the total area of the sealing rim, the temperature is 160° C. and the pressing time is 2 minutes. After slow cooling, the two-layer CCM is taken from the press.

b) Production of a Five-layer MEA

A large gas diffusion layer for the anode (type 30 BC, SGL-Carbon, Meitingen) is provided over its entire area with a catalyst layer (Pt loading=0.2 mg/cm$^2$). After drying, a smaller GDL having dimensions of 76×76 mm is stamped out. As gas diffusion layer for the cathode, use is made of a catalyst-free GDL having dimensions of 76×76 mm. Anode gas diffusion layer, two-layer CCM and cathode gas diffusion layer are stacked on top of one another so that the active area is centered and the anode catalyst layer comes into contact with the uncoated membrane side. The structure is subsequently pressed in a hot press at 135° C. for 3 minutes. The area pressure (based on the area of the gas diffusion layer) is 100 N/cm$^2$. Slow cooling gives a five-layer MEE whose individual components are firmly bonded.

c) Electrochemical Measurement

The five-layer MEA is built into a single cell in a PEM fuel cell test station and tested under hydrogen/air conditions (pressure: 1 bar, temperature: 70° C.). A cell voltage of 705 mV is obtained at a current density of 600 mA/cm$^2$. This corresponds to a good power density of 0.42 W/cm$^2$.

The invention claimed is:

1. A catalyst-coated ion-conducting membrane for electrochemical devices, which comprises a membrane having front and reverse sides and an edge region, at least one catalyst layer and a sealing material, wherein the sealing material is applied in the edge region of the ion-conducting membrane and overlaps the ion-conducting membrane circumferentially in the edge region to a width of at least 1 mm on either the front or reverse side.

2. The catalyst-coated ion-conducting membrane as claimed in claim 1, wherein the thickness of the sealing material ($d_D$) corresponds to at least the thickness of the catalyst-coated ion-conducting membrane ($d_{CCM}$).

3. The catalyst-coated ion-conducting membrane as claimed in claim 1, wherein the at least one catalyst layer comprises precious metal based catalysts and is applied over the entire area of the ion-conducting membrane.

4. The catalyst-coated ion-conducting membrane as claimed in claim 1, which comprises a catalyst layer on the front side and a second catalyst layer on the reverse side of the ion-conducting membrane.

5. The catalyst-coated ion-conducting membrane as claimed in claim 1, wherein the sealing material comprises a thermoplastic polymer and/or copolymer selected from the group consisting of polyethylenes, polypropylenes, polytetrafluoroethylenes, PVDF, polyesters, polyamides, polyamide elastomers, polyimides and polyurethanes, an elastomer selected from the group consisting of silicones, silicone elastomers, EPDM, fluorinated elastomers, perfluorinated elastomers, chloroprene elastomers, and fluorosilicone elastomers and/or a thermoset polymer selected from the group consisting of epoxy resins, phenolic resins and cyano-acrylates.

6. The catalyst-coated ion-conducting membrane as claimed in claim 1, wherein the ion-conducting membrane comprises an organic polymer selected from the group consisting of proton-conducting perfluorinated polymeric sulfonic acid compounds, doped polybenzimidazoles, polyether ketones, polysulfones and ion-conducting ceramic materials.

* * * * *